(12) United States Patent
Maskatia et al.

(10) Patent No.: US 7,106,579 B2
(45) Date of Patent: Sep. 12, 2006

(54) PORTABLE ELECTRONIC DEVICE WITH A HINGE MECHANISM

(75) Inventors: Arif Maskatia, San Jose, CA (US);
Stephen Cheung, San Jose, CA (US);
Erich Elkins, San Jose, CA (US);
Christopher Fruhauf, San Jose, CA (US)

(73) Assignee: Acer Inc., Taipei (TW)

( * ) Notice: Subject to any disclaimer, the term of this patent is extended or adjusted under 35 U.S.C. 154(b) by 140 days.

(21) Appl. No.: 10/456,537

(22) Filed: Jun. 9, 2003

(65) Prior Publication Data
US 2004/0246667 A1 Dec. 9, 2004

(51) Int. Cl.
*G06F 1/16* (2006.01)
(52) U.S. Cl. ............ 361/683; 361/681; 312/223.1
(58) Field of Classification Search ........ 361/680–686; 439/164, 165; 345/179, 905, 168, 169; 248/917–920
See application file for complete search history.

(56) References Cited

U.S. PATENT DOCUMENTS

| 5,196,993 | A | * | 3/1993 | Herron et al. | 361/681 |
| 5,548,478 | A | * | 8/1996 | Kumar et al. | 361/681 |
| 6,636,419 | B1 | * | 10/2003 | Duarte | 361/680 |
| 6,687,119 | B1 | * | 2/2004 | Lai et al. | 361/683 |
| 6,700,773 | B1 | * | 3/2004 | Adriaansen et al. | 361/680 |

* cited by examiner

*Primary Examiner*—Lisa Lea-Edmonds
(74) *Attorney, Agent, or Firm*—Michael Bednarek; Pillsbury Winthrop Shaw Pittman LLP

(57) ABSTRACT

A portable electronic device includes an expansion base module with a connector, a hinge mechanism mounted slidably on the expansion base module, slidable relative to the expansion base module, and including a pivot shaft, a system module pivoted to the expansion base module through the pivot shaft, and a ribbon cable having a first segment that is electrically connected to and that extends from the connector toward the pivot shaft, and a second segment that extends from the first segment, that is wound around the pivot shaft, and that is electrically connected to the system module.

7 Claims, 5 Drawing Sheets

PORTABLE ELECTRONIC DEVICE WITH A HINGE MECHANISM

BACKGROUND OF THE INVENTION

1. Field of the Invention

This invention relates to a portable electronic device with a hinge mechanism that provides an extra function for preventing twist of a ribbon cable.

2. Description of the Related Art

FIGS. 1 and 2 illustrate a conventional portable computer disclosed in U.S. Pat. No. 5,548,478. The portable computer includes a base module 91 formed with a pair of opposite rail grooves 911, and a display panel 92 that is mounted pivotally and slidably on the base module 91 through a pair of pins 921 that respectively extend into the rail grooves 911. A ribbon cable 93 electrically connects the base module 91 to the display module 92. The display module 92 is pivotable relative to the base module 91 so as to overlay on the base module 91 as illustrated in FIG. 2 when the display module 92 is slid to a front end of the base module 91. As such, the portable computer can serve as a tablet computer.

The conventional portable computer is disadvantageous in that since the ribbon cable 93 is constantly disposed in a folded state on a center region of the base module 91 between two opposite sides of the base module 91, the space around the central region cannot be effectively used. Moreover, the arrangement of the ribbon cable 93 may cause the ribbon cable 93 to be twisted or disorderly disposed during sliding movement of the display panel 92 relative to the base module 91.

The whole disclosure of U.S. Pat. No. 5,548,478 is incorporated herein by reference.

SUMMARY OF THE INVENTION

Therefore, the object of the present invention is to provide a portable electronic device that is capable of overcoming the aforesaid drawbacks of the prior art.

According to the present invention, there is provided a portable electronic device that comprises: an expansion base module having front and rear ends and two opposite sides that extend between the front and rear ends in a longitudinal direction, the expansion base module including a connector that is disposed between the front and rear ends and adjacent to one of the opposite sides; a hinge mechanism mounted slidably on the expansion base module and slidable relative to the expansion base module in the longitudinal direction between the front and rear ends of the expansion base module, the hinge mechanism including a pivot shaft that extends in a transverse direction relative to the longitudinal direction; a system module pivoted to the expansion base module through the pivot shaft so as to be pivotable about the pivot shaft and so as to be co-slidable with the hinge mechanism; and a ribbon cable having a first segment that is electrically connected to and that extends rearwardly from the connector toward the pivot shaft, and a second segment that extends from the first segment, that is wound around the pivot shaft, and that is electrically connected to the system module.

BRIEF DESCRIPTION OF THE DRAWINGS

In drawings which illustrate an embodiment of the invention.

DETAILED DESCRIPTION OF THE PREFERRED EMBODIMENT

Figure 1:
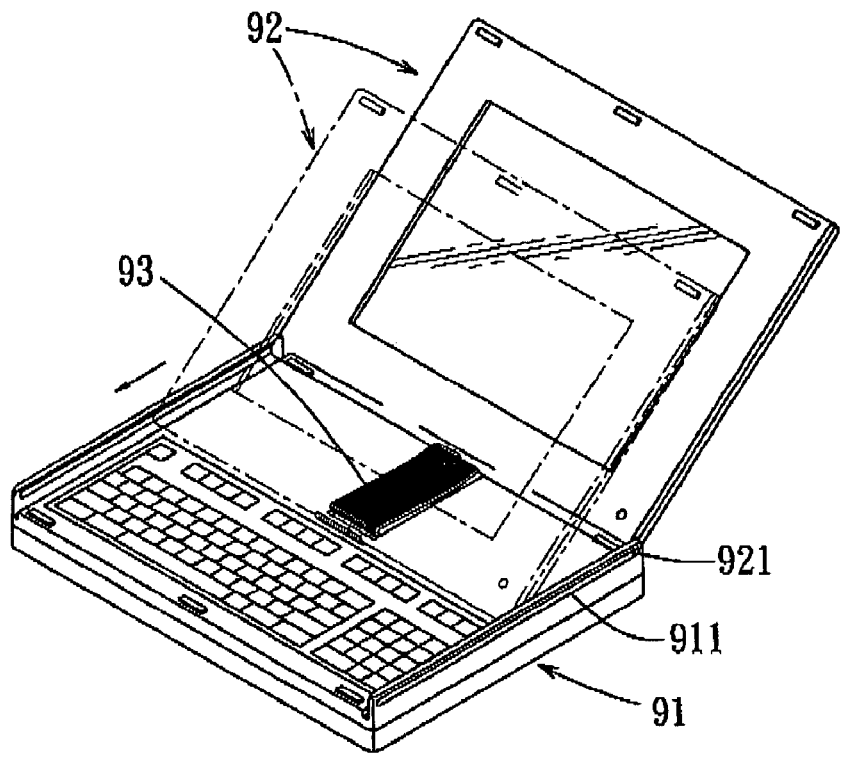
FIG. 1 is a perspective view of a conventional portable computer with a display panel disposed in an upwardly inclined state relative to a base module.
Figure 2:
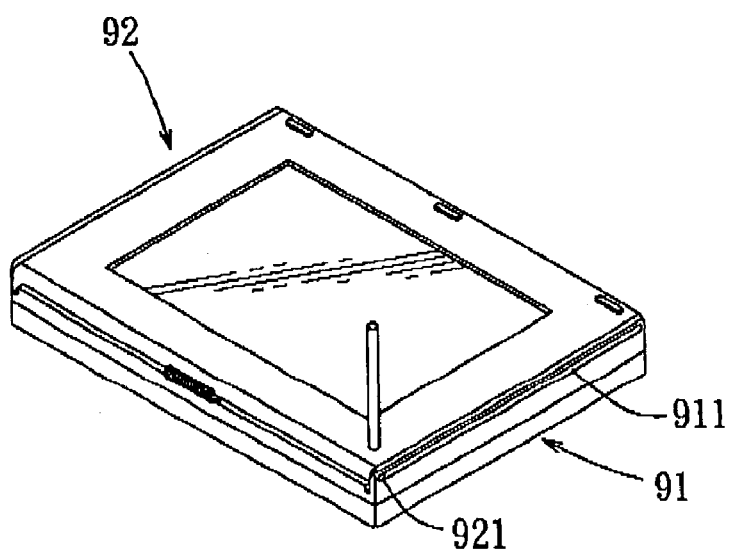
FIG. 2 is a perspective view of the portable computer of FIG. 1 with the display panel disposed in a horizontal state relative to the base module.
Figure 3:
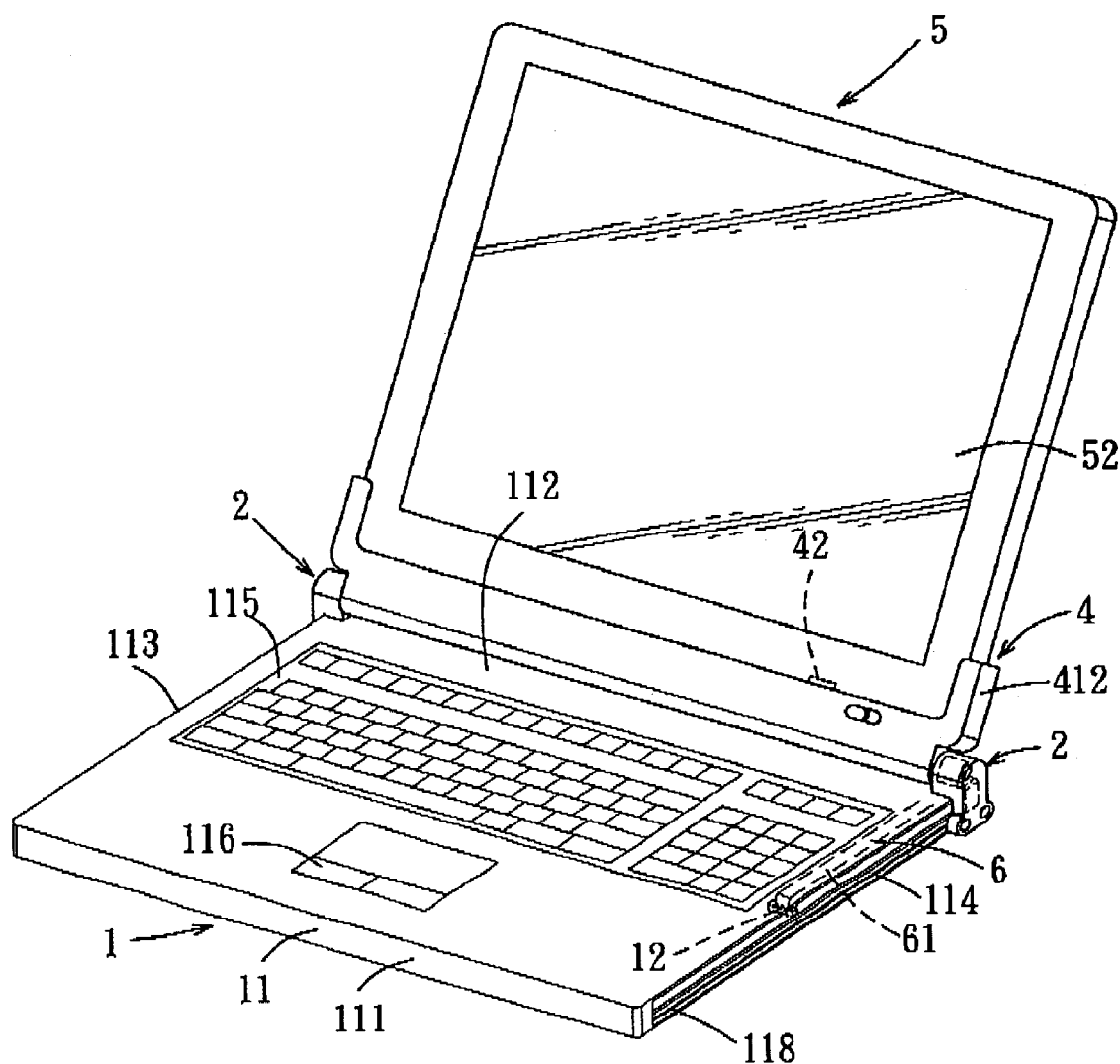
FIG. 3 is a perspective view of the preferred embodiment of a portable computer according to this invention.
Figure 4:
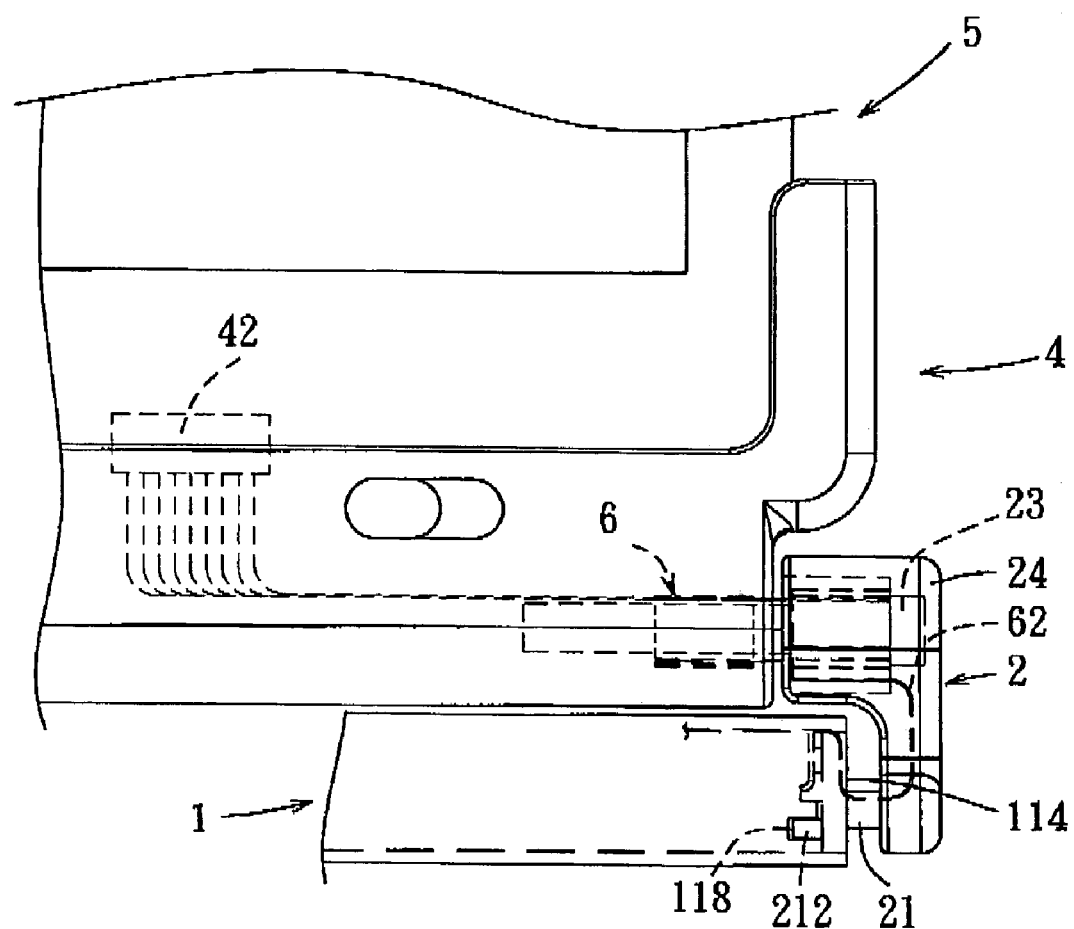
FIG. 4 is a fragmentary schematic view to illustrate how a ribbon cable of the portable computer of FIG. 3 is arranged.
Figure 5:
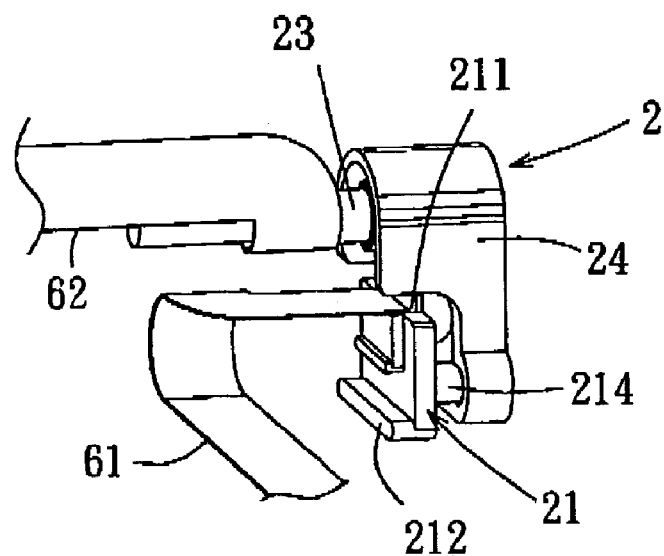
FIG. 5 is a fragmentary perspective view of the ribbon cable of FIG. 4 viewing from an angle.
Figure 6:
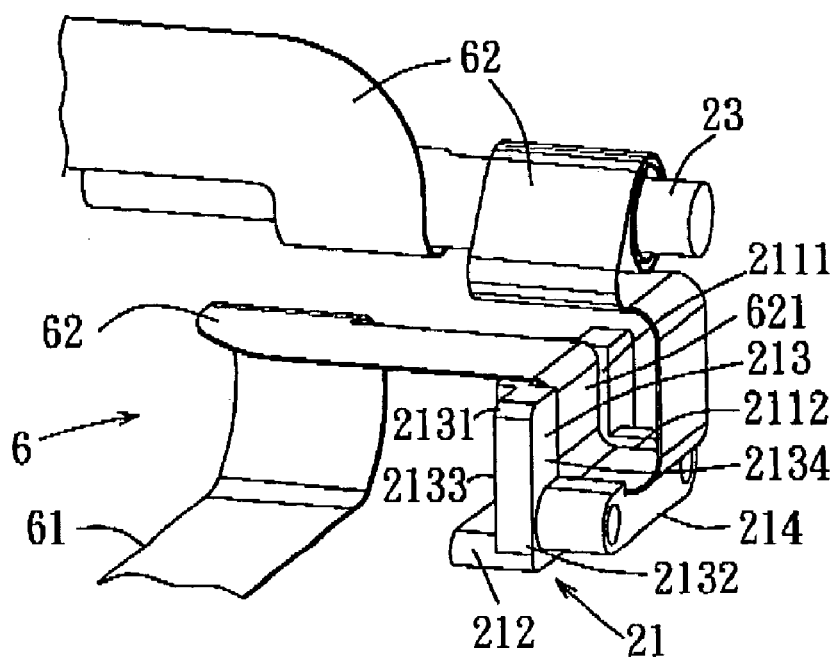
FIG. 6 is a fragmentary perspective view of the ribbon cable of FIG. 4 viewing from another angle.

This invention relates to a portable electronic device, such as a portable computer, a palm PC, a pocket PC, or a cellular phone.

FIGS. 3 to 6 illustrate the preferred embodiment of a portable computer 100 according to the present invention. The portable computer 100 combines an expansion base module 1 and a system module 5, such as a liquid crystal display (LCD) panel, a touch input panel, or a computer slate (which normally includes a mother board, a CPU, a memory Unit, a display panel, a hard disc, a battery unit, and electronic components which allow the computer slate to function as a portable computer).

The expansion base module 1 has front and rear ends 111, 112 and two opposite sides 113, 114 that extend between the front and rear ends 111, 112 in a longitudinal direction, and includes a housing 11, and a first connector 12 that is disposed in the housing 11 between the front and rear ends 111, 112 and adjacent to one of the opposite sides 114.

A hinge mechanism 2 is mounted slidably on the expansion base module 1, is slidable relative to expansion base module 1 in the longitudinal direction between the front and rear ends 11, 1112 of the expansion base module 1, and includes a pair of pivot shafts 23 that are disposed above the expansion base module and that extends in a transverse direction relative to the longitudinal direction.

The system module 5 is pivoted to the expansion base module 1 through the pivot shafts 23 so as to be pivotable about the pivot shafts 23 and so as to be co-slidable with the hinge mechanism 2 in the longitudinal direction.

A ribbon cable 6 has a first segment 61 that is disposed adjacent to the side 114 of the expansion base module 1 and that is electrically connected to and that extends rearwardly from the first connector 12 toward an adjacent one of the pivot shafts 23, and a second segment 62 that extends from the first segment 61, that is wound around the adjacent pivot shaft 23, and that is electrically connected to the system module 5 through a second connector 42.

Preferably, the first segment 61 of the ribbon cable 6 extends in the longitudinal direction, and has a length that is about half of the traveling distance of the hinge mechanism 2 traveling from the front end 111 to the rear end 112 of the expansion base module 1.

Each of the opposite sides 113, 114 of the expansion base module 1 is formed with a rail groove 118 that extends in the longitudinal direction between the front and rear ends 111, 112 of the expansion base module 1. The hinge mechanism 2 further includes a pair of sliding members 21 that are respectively aligned with and that are respectively disposed below the pivot shafts 23, and a pair of sleeves 24 that are securely and respectively sleeved on free ends of the pivot shafts 23 and the sliding members 21. Each sliding member 21 is formed with a rail guide 212 that projects therefrom into the rail groove 118 so as to permit sliding movement of the hinge mechanism 2 on the expansion base module 1.

Each sliding member 21 further includes a vertically extending plate 213 that is disposed sidewisely adjacent to the respective rail groove 118 and that has top and bottom ends 2131, 2132 and two opposite side faces 2133, 2134, and a stud 214 projecting transversely from one of the opposite side faces 2134 of the vertically extending plate 213 into the respective sleeve 24 and disposed adjacent to the bottom end 2132 of the vertically extending plate 213. The rail guide 212 projects transversely from the other of the opposite side faces 2133 of the vertically extending plate 213 at the bottom end 2132 of the vertically extending plate 213 into the respective rail groove 118. The vertically extending plate 213 of one of the sliding member 21 is formed with an L-shaped retaining recess 211 that has a first section 2111 which is indented from the one of the opposite side faces 2134 of the vertically extending plate 213 and which extends from the top end 2131 to the bottom end 2132 of the vertically extending plate 213, and a second section 2112 which is indented from the stud 214. The second segment 62 of the ribbon cable 6 has a section 621 that is snugly fitted into the retaining recess 211.

In this preferred embodiment, the base expansion module 1 includes a keyboard 115 and a cursor touch pad 116. The base expansion module 1 may further includes expansion hard disc(s) (not shown), expansion battery(s) (not shown), CD-ROM (not shown), and speakers (not shown). The system module 5 includes a computer slate with an LCD display panel 52, a circuit board (not shown), a CPU (not shown), and a memory module (not shown), and a docking unit 4 disposed between and interconnecting the computer slate and the expansion base module 1.

Figure 7:
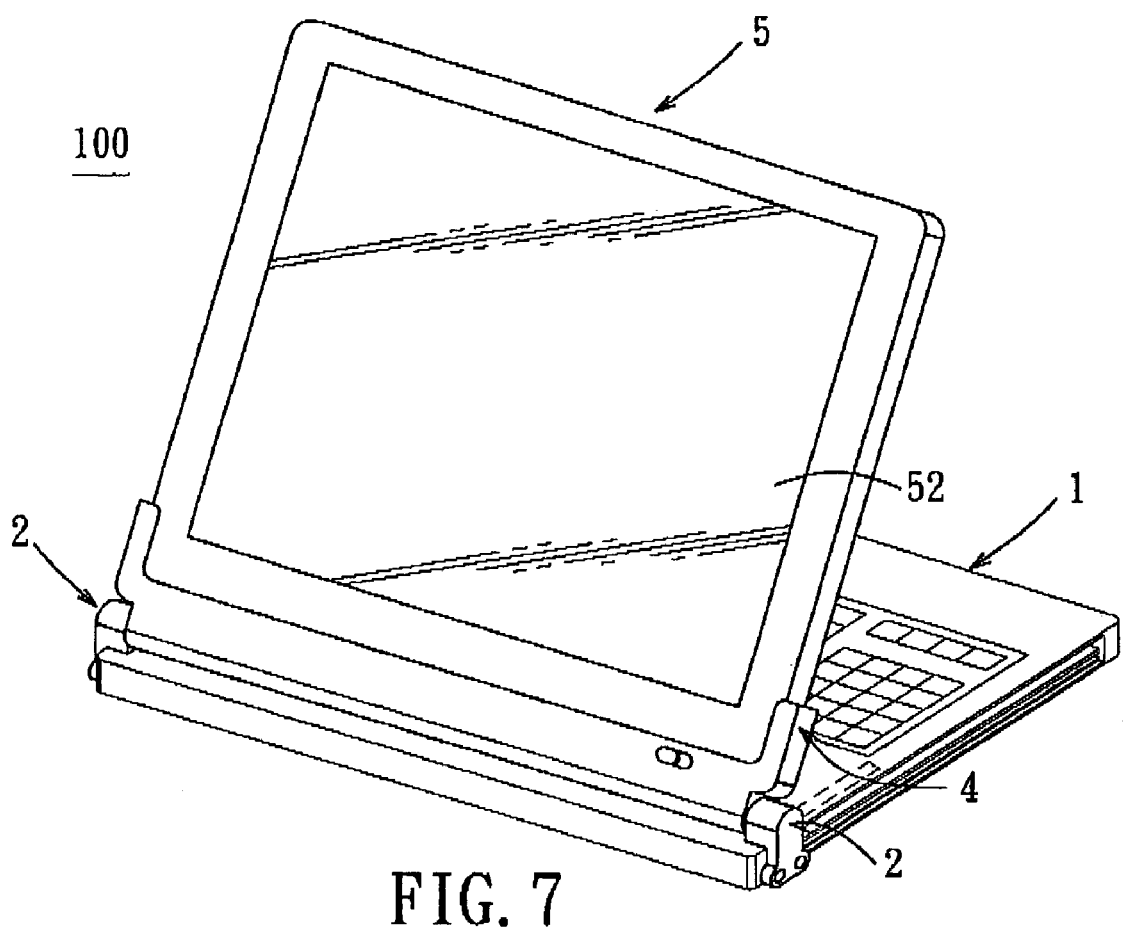
FIG. 7 is a perspective view of the portable computer of FIG. 3 with a system module slid to a front end of an expansion base module.
Figure 8:
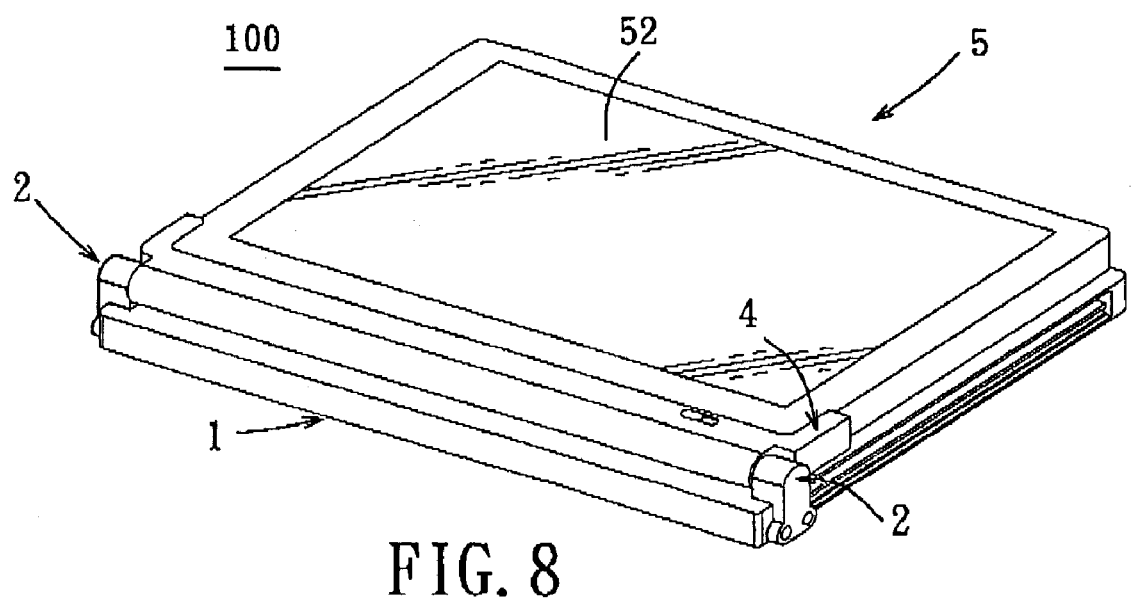
FIG. 8 is a perspective view of the portable computer of FIG. 3 with the system module pivoted to a horizontal position to overlay on the expansion base module.

With reference to FIGS. 7 and 8, the portable computer 100 of this invention can be easily converted into a tablet computer by sliding the system module 5 to the front end 111 of the expansion base module 1 and subsequently pivoting the system module 5 about the pivot shafts 23 relative to the expansion base module 1 to a horizontal position to overlay on the expansion base module 1.

By virtue of the routing of the ribbon cable 6, the drawbacks as encountered in the prior art can be eliminated.

With the invention thus explained, it is apparent that various modifications and variations can be made without departing from the spirit of the present invention.

We claim:

1. A portable electronic device comprising:
   an expansion base module having a housing with front and rear ends and two opposite sides that extend between said front and rear ends in a longitudinal direction, said expansion base module including a connector that is disposed in said housing between said front and rear ends and adjacent to one of said opposite sides;
   a hinge mechanism mounted slidably on said expansion base module and slidable relative to said expansion base module in said longitudinal direction between said front and rear ends of said expansion base module, said hinge mechanism including a pivot shaft that extends in a transverse direction relative to said longitudinal direction;
   a system module pivoted to said expansion base module through said pivot shaft so as to be pivotable about said pivot shaft and so as to be co-slidable with said hinge mechanism; and
   a ribbon cable having a first segment that is disposed in said housing and that is electrically connected to and that extends rearwardly from said connector toward said pivot shaft, and a second segment that extends from said first segment, that is wound around said pivot shaft, and that is electrically connected to said system module.

2. The portable electronic device of claim 1, wherein said first segment extends in said longitudinal direction and has a length that is about half of the traveling distance of said hinge mechanism traveling from said front end to said rear end of said expansion base module.

3. The portable electronic device of claim 2, wherein said one of said opposite sides of said expansion base module is formed with a rail groove that extends in said longitudinal direction between said front and rear ends of said expansion base module, said hinge mechanism further including a sliding member that is aligned with and that is disposed below said pivot shaft, and a sleeve that is securely sleeved on a free end of said pivot shaft and said sliding member, said sliding member being formed with a rail guide that projects therefrom into said rail groove so as to permit sliding movement of said hinge mechanism on said expansion base module.

4. The portable electronic device of claim 3, wherein said sliding member further includes a vertically extending plate disposed sidewisely adjacent to said rail groove and having top and bottom ends and two opposite side faces, and a stud projecting transversely from one of said opposite side faces of said vertically extending plate into said sleeve and disposed adjacent to said bottom end of said vertically extending plate, said rail guide projecting transversely from the other of said opposite side faces of said vertically extending plate into said rail groove and being disposed adjacent to said bottom end of said vertically extending plate, said vertically extending plate being formed with an L-shaped retaining recess that has a first section which is indented from said one of said opposite side faces of said vertically extending plate and which extends from said top end to said bottom end of said vertically extending plate, and a second section which is indented from said stud, said second segment of said ribbon cable having a section that is snugly fitted into said retaining recess.

5. The portable electronic device of claim 4, wherein said system module includes a liquid crystal display panel.

6. The portable electronic device of claim 4, wherein said expansion base module includes a keyboard.

7. The portable electronic device of claim 4, wherein said system module includes a touch input panel, said system module being pivotable about said pivot shaft to a horizontal position so as to overlay on said expansion base module when said system module is slid to said front end of said expansion base module.

* * * * *